United States Patent [19]

Itoh et al.

[11] Patent Number: 5,326,735
[45] Date of Patent: Jul. 5, 1994

[54] IRIDIUM CATALYSTS FOR PURIFYING EXHAUST GAS

[75] Inventors: Takashi Itoh; Yukio Kosaki, both of Ichikawa, Japan

[73] Assignee: N.E. Chemcat Corporation, Tokyo, Japan

[21] Appl. No.: 953,879

[22] Filed: Sep. 30, 1992

[30] Foreign Application Priority Data

Jul. 10, 1992 [JP] Japan .................................. 4-207502

[51] Int. Cl.$^5$ ...................... B01J 27/22; B01J 27/224; B01J 27/24
[52] U.S. Cl. .............................. 502/177; 423/213.5; 502/178; 502/200
[58] Field of Search ........................ 502/177, 178, 200; 423/213.5

[56] References Cited

U.S. PATENT DOCUMENTS

| 3,953,363 | 4/1976 | Yamauchi et al. | 502/178 |
| 4,039,622 | 8/1977 | Murrell et al. | 423/239 |
| 4,372,933 | 2/1983 | Kyung et al. | 502/178 X |
| 4,492,770 | 1/1985 | Blanchard et al. | 502/326 X |

FOREIGN PATENT DOCUMENTS

| 0399891 | 11/1990 | European Pat. Off. . |
| 2201711 | 4/1974 | France . |
| 2163364 | 2/1986 | United Kingdom . |

*Primary Examiner*—Paul E. Konopka
*Attorney, Agent, or Firm*—Wenderoth, Lind & Ponack

[57] ABSTRACT

A catalyst comprising an iridium supported on at least one carrier selected from the group consisting of metal carbides and metal nitrides for eliminating nitrogen oxides in exhaust gas in the presence of oxygen in excess of the stoichiometric quantity of oxidizing components for reducing components. The catalyst is effective for eliminating $NO_x$ in exhaust gas from lean burn engines such as lean burn gasoline engines and diesel engines containing excess $O_2$ corresponding to an A/F ratio of 17 or over.

8 Claims, 2 Drawing Sheets

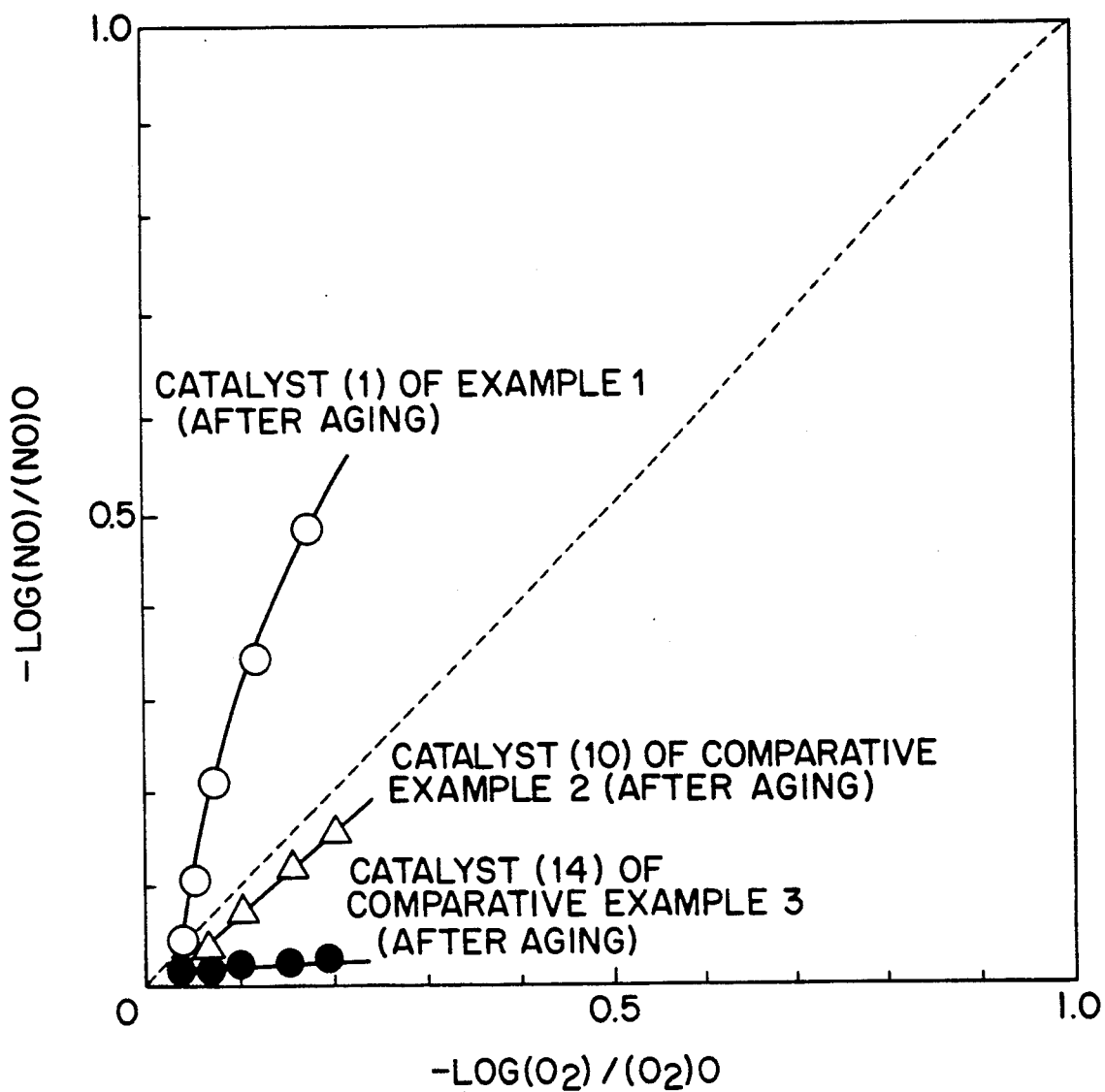

IRIDIUM CATALYSTS FOR PURIFYING
EXHAUST GAS

BACKGROUND OF THE INVENTION

1. Field of the Invention

The present invention relates to a catalyst for purifying exhaust gas from internal combustion engines and the like, and more particularly to a catalyst suitable for eliminating nitrogen oxides exhausted from internal combustion engines and the like.

2. Description of the Prior Art

Nitrogen oxides ($NO_x$) exhausted from internal combustion engines and the like cause photochemical smog or acid rain and the removal of nitrogen oxides from the sources is an urgent problem to be solved.

Conventionally, for exhaust gas from large-scale stationary sources like thermal power plants and the like, a selective catalytic reduction method is used which adds ammonia to the exhaust gas and uses a $TiO_2$-$V_2O_5$ catalyst. For exhaust gas from gasoline engines of automobiles and the like, the three-way catalyst (TWC) method is applied in which the air/fuel ratio is controlled near to the stoichiometric quantity (A/F=14.6) and a Pt-Rh/$Al_2O_3$ catalyst is used to eliminate $NO_x$, carbon monoxide (CO), and hydrocarbons (HC) simultaneously.

On the other hand, recently, to prevent global warming, it has become necessary to control the emission of carbon dioxide ($CO_2$) and it is demanded to put lean burn gasoline engines to practical use, but the three-way catalyst is not effective in treating the exhaust gas from lean burn gasoline engines.

Although diesel engines are essentially of the lean burn system, the elimination of floated particulate substances and $NO_x$ present in the exhaust gas from diesel engines is now an urgent problem to be solved.

Hereinafter, the engines of the lean burn system like these lean burn gasoline engines and diesel engines are generally called lean burn engines.

The exhaust gas from lean burn engines contains oxidizing agents such as oxygen ($O_2$) and $NO_x$ in excess of the stoichiometric quantity required for oxidation of reducing components such as HC, CO, and hydrogen ($H_2$), and particularly contains oxygen in such a large quantity that the air/fuel ratio becomes 17 or over. It has long been a problem to be solved that $NO_x$ in exhaust gas is selectively eliminated in the presence of this excess oxygen without adding a special reducing agent such as ammonia.

Once, the use of iridium (Ir) catalysts supported on a porous inorganic oxide such as alumina ($Al_2O_3$) for ridding exhaust gas having excess oxygen of $NO_x$ was suggested (Japanese Patent Publication (kokoku) Nos. 56-54173 (1981) and 57-13328 (1982) and U.S. Pat. No. 4,039,622 (1977)). However, in Examples in the above-mentioned Japanese Patent Publications and U.S. Patent, the performance of catalysts is shown only under conditions wherein the concentration of oxygen in exhaust gas is 3% or less, i.e., the A/F ratio is less than 17, which means the suggestions are unsatisfactory, in terms of selectivity and life, to the elimination of $NO_x$ from exhaust gas containing excess oxygen equivalent to the air/fuel ratio of 17 or over from lean burn engines.

For the elimination of $NO_x$ from exhaust gas from lean burn engines, in recent years, for example, aluminosilicates on which a transition metal such as copper (Cu) is supported by ion exchange (U.S. Pat. No. 4,297,328 and Japanese Pre-examination Patent Publication (kokai) No. 63-100919 (1988)), metallosilicates (Japanese Pre-examination Patent Publication (kokai) Nos. 3-127628 (1991) and 3-229620 (1991), or silicoaluminophosphate catalysts (japanese Pre-examination Patent Publication (kokai) No. 1-112488 (1989) (hereinafter referred generally to as metallosilicate catalysts) are reported to have certain degrees of selectivity. However, these catalysts are attended with such fatal defects that the effective temperature range in which $NO_x$ is eliminated is narrowly restricted and that the catalyst is deteriorated irreversibly within few hours under a high temperature of about 650° to 700° C. due to the steam present in exhaust gas and the activity is extremely lowered.

SUMMARY OF THE INVENTION

The present invention has been made to solve the problems of the above conventional catalysts and an object of the present invention is to provide a catalyst for purifying exhaust gas which is high in activity and heat resistance, excellent in durability, and effective in eliminating $NO_x$ in exhaust gas containing oxygen in excess of the stoichiometric quantity, particularly exhaust gas from lean burn engines that contains excess oxygen equivalent to the air/fuel ratio of 17 or over.

The inventors have found that a catalyst comprising an iridium supported on at least one carrier selected from the group consisting of metal carbides and metal nitrides solve the above problems.

The present catalyst is applied to a treatment of exhaust gas containing $NO_x$, HC, CO, etc. from internal combustion engines and the like and is particularly effective in eliminating $NO_x$ in exhaust gas containing $O_2$ in excess of the stoichiometric quantity for reducing agents such as HC, CO, $H_2$, etc.

Generally, exhaust gas from lean burn engines contains 2 to 8% of $O_2$ and hundreds to thousands ppm of $NO_x$ as well as hundreds to thousands ppm of HC and hundreds to thousands ppm of CO. Upon contact of the exhaust gas with the present catalyst, a high $NO_x$ elimination rate of 50% or more is attained in a wide temperature range of from 250° C. to 650° C. or over of an exhaust gas at the inlet of the catalyst layer.

Exhaust gas from diesel engines generally contains as high as 5 to 15% of $O_2$ and although it is very difficult to cause one hundred to hundreds ppm of NOx to react with about tens to about one hundred ppm of HC and hundreds ppm of CO selectively, if a system is adopted wherein hundreds to one thousand and hundreds ppm in terms of methane of an unburned fuel is added to that exhaust system and then the exhaust gas is brought in contact with the present catalyst, an $NO_x$ elimination rate of 50% or more can be attained even for exhaust gas from diesel engines.

Generally, the exhaust gas from lean burn engines contains water in a quantity of about 5 to 15% as an oxidized product of the fuel. The present catalyst functions stably up to about 800° to 850° C. for the lean burn engine exhaust gas containing water and is improved in heat resistance considerably.

As described above, since the present catalyst is effective in eliminating $NO_x$ present in the exhaust gas containing $NO_x$, HC, CO, etc., particularly the exhaust gas from lean burn gasoline engines and diesel engines containing excess $O_2$ with an air/fuel ratio of 17 or over and has a high $NO_x$ elimination rate and a long-term stability, the exhaust gas purifying system using the present catalyst is highly effective.

BRIEF DESCRIPTION OF THE DRAWINGS

FIG. 2 shows the results of the kinetic partitioning between the reaction of HC and NO and the reaction of HC and $O_2$ after aging of the catalyst of an Example of the present invention and the catalysts of Comparative Examples.

DETAILED DESCRIPTION OF PREFERRED EMBODIMENTS

Carriers

Figure 1:
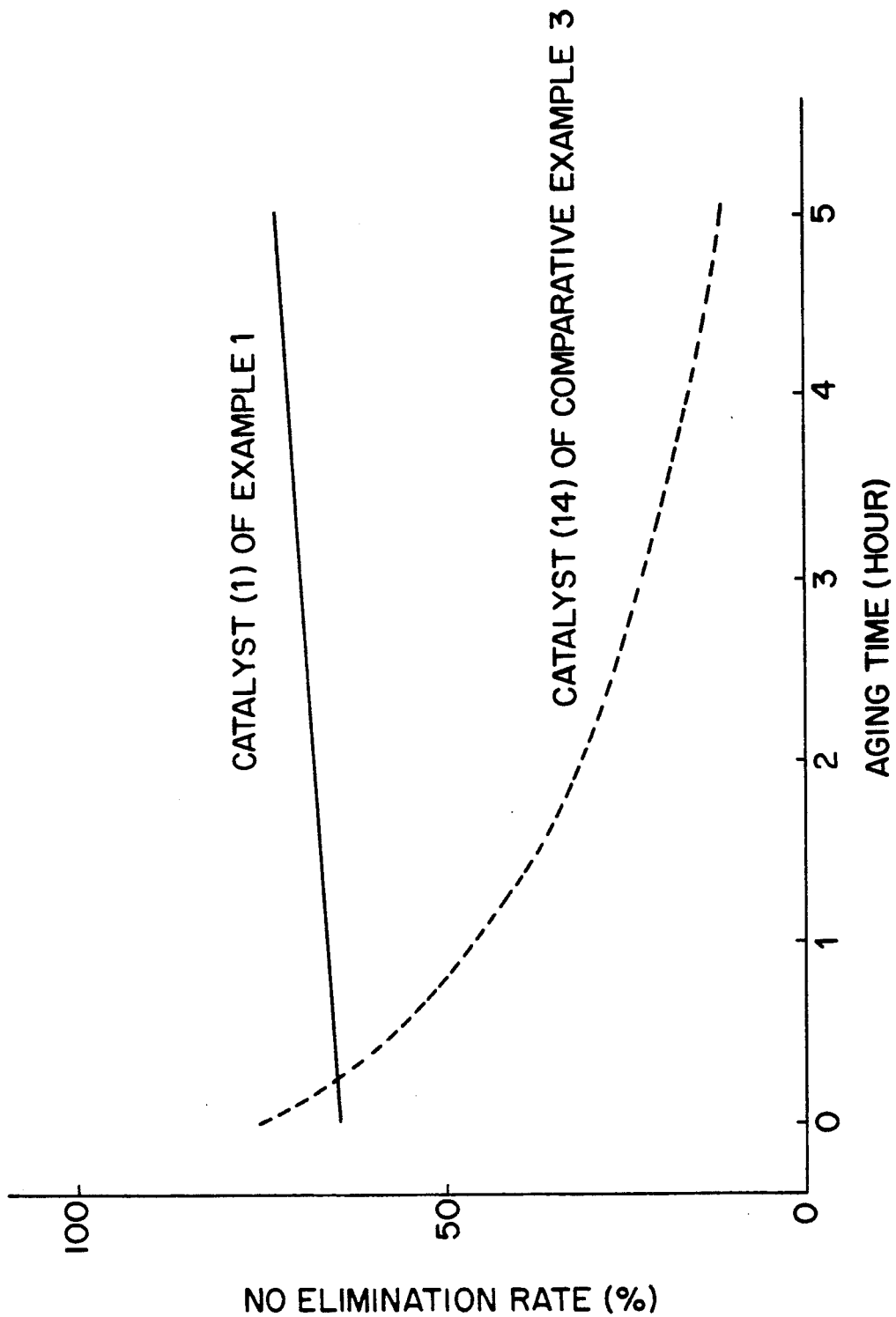
FIG. 1 is a graph showing the dependencies of the NO elimination rates on aging of the catalyst of an Example of the present invention and the catalyst of a Comparative Example in evaluation using a lean burn engine exhaust model gas when they were thermally aged at 800° C. in air containing steam.

As a carrier of the present catalyst, at least one carrier selected from the group consisting of metal carbides and metal nitrides is used. The metal carbide includes, for example, silicon carbide, titanium carbide, boron carbide, vanadium carbide, and tantalum carbide and the metal nitride includes, for example, titanium nitride, chromium nitride, and zirconium nitride, which may be used singly or as a mixture of two or more. Among them, silicon carbide, titanium carbide, titanium nitride, and a mixture of two or more of these are preferable.

There is no particular restriction on the form of the metal carbide and the metal nitride if it is stable in air containing steam at at least 800° C., preferably up to 1,000° C. As an inexpensive available one, for example, commercially available whiskers or powders having a particle diameter of about 0.1 to about 100 μm can be used.

Conventionally, it is an established theory in the art that, with respect to the Ir catalysts for purifying exhaust gas, those having a very small particle diameter and supported on a porous metal oxide carrier with a high specific surface area in high degree of dispersion exhibit a high activity and a high selectivity for the $NO_x$ reduction reaction (e.g., K. C. Taylor and J. C. Schlatter, J. Catal., 63 (1) 53–71 (1980)). However, not only the fact that the carrier of the present catalyst is not a metal oxide but a metal carbide or a metal nitride, but also the fact that the carrier has a low specific surface area and is non-porous are the unique features that enable the present catalyst to have a high activity and a long life for eliminating $NO_x$ in lean burn engine exhaust gases containing oxygen in a quantity greater than the stoichiometric quantity in the presence of steam at high temperatures.

That is, preferably the metal carbide and the metal nitride used as a carrier in the present invention has generally a BET specific surface area of 20 m²/g or less, more preferably 10 m²/g or less, and a pore volume of 0.5 cm³/g or less.

Active Metals

In the present catalyst, an Ir is supported on the above carrier. There is no particular restriction on the state of the Ir present on the carrier, but preferably the Ir is in the state of the metal, or the state of an oxide such as IrO, $Ir_2O_3$, and $IrO_2$, or the state of a mixture of these. However, $IrO_3$ is not so preferable because it is volatile. These Ir's are dispersed and supported on the carrier with the crystallite diameter of the Ir's being preferably 2 to 100 nm, more preferably 5 to 20 nm. If the crystallite diameter is too small, the selectivity of the oxidation reaction of reducing agents, HC and CO, with $O_2$ becomes too high, which is not preferable. On the other hand, if the crystallite diameter is too large, the activity is not so high for the supported amount.

The amount of Ir to be supported on the carrier is preferably 0.005 to 10.0 wt. %, more preferably 0.1 to 2.0 wt. %, based on the total amount of the Ir and the carrier. If the amount of Ir to be supported is too small, the activity of the catalyst itself is too low, whereas if the amount is too large, the reaction between oxygen and reducing agents is facilitated and the selectivity of reduction of $NO_x$ is lowered.

Preparation of the Catalyst

The method of the preparation of the catalyst by supporting Ir on the carrier is not particularly restricted and conventionally known methods may be followed.

For example, for the preparation a carrier is impregnated with an aqueous solution of a soluble salt of Ir such as iridium trichloride ($IrCl_3$), chloroiridic acid ($H_2IrCl_6$), sodium hexachloroiridate (III) ($Na_3IrCl_6$), sodium hexachloroiridate (IV) ($Na_2IrCl_6$), potassium hexachloroiridate (III) ($K_3IrCl_6$), potassium hexachloroiridate (IV) ($K_2IrCl_6$), iridium nitrate ($Ir(NO_3)_4$) or iridium sulfate ($Ir(SO_4)_2$), and after drying, the obtained mixture is calcined for decomposition of the salt to prepare the intended catalyst.

Alternatively, for the preparation of the catalyst, a carrier is impregnated with a solution of an organic metal complex of Ir such as $Ir_3(CO)_{12}$ in a solvent such as hexane and ethanol and the impregnated product is calcined for decomposition of the salt to prepare the desired catalyst.

In any case, the atmosphere in which the decomposition of the Ir compound as a catalyst precursor impregnated into the carrier is carried out by calcination is suitably selected depending upon the kind of the precursor and, for example the decomposition is carried out in air, in a vacuum, in a stream of an inert gas such as nitrogen or in a stream of hydrogen. Generally the calcination temperature is preferably 300° to 900° C., more preferably 600° to 800° C., and the time of calcination may generally be about 30 min to 10 hours.

The calcination may be carried out by using a combination of steps. For example, after calcination in air, the reduction may be carried out in a stream of hydrogen.

Further, the thus prepared catalyst may be subjected to a stabilizing process by calcinating the prepared catalyst at 650° to 800° C. for 30 min to 5 hours under a stream containing 10 to 100% of steam (the rest being air or nitrogen).

By such a heat treatment, the Ir compound is converted to metal Ir or Ir oxides having a crystallite diameter of about 5 to 20 nm.

The present catalyst may be used by compacting or molding it into a shaped product with a suitable definite shape such as the shape of pellets, spheres, rinds, or a honeycomb optionally after mixing it with a suitable binder, or Ir may be impregnated into a carrier which has previously been formed into a suitable shape so that the Ir may be supported on the carrier.

Further, the present catalyst may be used by coating (e.g., wash-coating) it optionally using a suitable binder on the surface of a shaped refractory support substrate in the shape of a honeycomb of stainless steel or a ceramic such as cordierite and mullite. In this case, the amount of the coating on the support substrate is preferably 20 to 200 g/liter, more preferably 60 to 120 g/liter of the volume of the support substrate, and the amount of the supported Ir is preferably in the range of 0.01 to 5.0 g/liter, more preferably 0.1 to 1.5 g/liter, of the volume of the support substrate.

As the binder, a conventional inorganic binder such as, for example, silica sol, alumina sol, and titania sol can be used.

The wash coat of the catalyst powder on a refractory support substrate can be made, for example, by adding water and silica sol to the catalyst powder, mixing them to form a thixotropic slurry, dipping the support substrate in the slurry, and drying and calcinating the wash-coated mass.

Usage

The present catalyst can purify exhaust gas, particularly eliminate $NO_x$ in exhaust gas, by bringing the catalyst into contact with the exhaust gas. At that time, there is no particular restriction on the gas space velocity, but the gas space velocity is preferably in the range of 5,000 to 200,000 hr, more preferably 10,000 to 150,000 hr. If the gas space velocity is too low, a large volume of the catalyst is required, while if the gas space velocity is too high, the purification rate drops.

By the present catalyst, $NO_x$ in exhaust gas is reducibly decomposed with reducing agents such as HC present in trace quantities to $N_2$ and $H_2O$, and at the same time the reducing agents such as HC are also oxidized to $CO_2$ and $H_2O$ and are eliminated. It is presumed that since the active metal, Ir, is interactively supported and stabilized on the surface of the carrier, the metal carbide or the metal nitride, the selectivity of the reaction of reducing agents such as HC and CO with $NO_x$ in exhaust gas is improved, resulting in that $NO_x$ in exhaust gas can be eliminated effectively.

EXAMPLES

Now, the present invention is described in more detail with reference to the following Examples, Comparative Examples, and Performance Evaluation Examples. However the present invention is not restricted to the following Examples.

EXAMPLE 1

Preparation of an Ir-on-Silicon Carbide Whisker Catalyst (a) Supporting of Ir on a powder carrier (method A)

3.0 liter of deionized water was placed in a 5-liter beaker, then 100 g of silicon carbide (SiC) whisker (having a diameter of 0.3 to 0.6 $\mu$m, a length of 5 to 15 $\mu$m, and a BET specific surface area of 3 $m^2/g$ and manufactured by Tokai Carbon Co., Ltd.) was charged thereinto and was allowed to affiliate with the deionized water. While the resulting slurry was stirred sufficiently, 100 ml of a solution of deionized water containing chloroiridic acid ($H_2IrCl_6$) (0.5 g in terms of Ir) was added dropwise. The obtained slurry was placed in a dish equipped with a steam jacket and was heated While stirring slowly to evaporate the deionized water to dryness. After the obtained solid was dried at 105° C., the solid was ground, and the resulting powder was placed in a porcelain tray and was calcined in a calcination furnace in an air atmosphere at 750° C. for 1 hour. Thereafter, the powder was further heated under an air stream containing 10% of steam at 800° C. for 1 hour, and then after letting it stand under that stream to cool to 300° C., it was allowed to stand in dry air to cool to room temperature, thereby preparing Ir-on-silicon carbide whisker powder.

(b) Wash-coating on a honeycomb 2.0 g of 30% silica sol and 50 ml of deionized water were added to 30 g of the catalyst powder obtained in (a) and the mixture was kneaded in a ball mill for 16 hours. Then a core piece having a diameter of 2.54 cm and a length of 6.35 cm gouged out from a commercially available 400-cell cordierite honeycomb was immersed in the obtained slurry. After pulling up the core piece from the slurry, the excess slurry was removed from the core piece by blowing air, and after drying, the resulting mass was calcined at 500° C. for 30 min. Thus, an Ir-on-silicon carbide catalyst honeycomb (1) coated with the catalyst in an amount of 80 g in terms of dry weight per liter of the honeycomb was obtained.

EXAMPLE 2

Preparation of Ir-on-Metal Carbide Catalysts and an Ir-on-Metal Nitride Catalyst (a) and (b) of Example 1 were repeated, except that, in place of the carrier silicon carbide whisker, silicon carbide powder (Green #4000 manufactured by CARBORUNDUM), titanium carbide (TIC) powder (having a particle diameter of 0.8 to 1 $\mu$m and manufactured by MACRO Division, KENNAMETAL, INC.), and titanium nitride (TiN) powder (having a particle diameter of 1.5 to 2 $\mu$m manufactured by MACRO Division, KENNAMETAL, INC.) were used, thereby preparing an Ir-on-silicon carbide catalyst (2), an Ir-on-titanium carbide catalyst (3), and an Ir-on-titanium nitride catalyst (4).

EXAMPLE 3

Preparation of an Ir-on-Silicon Carbide Catalyst (Method B)

(a) A wash coat of silicon carbide powder (b) of Example 1 was repeated, except that, in place of the catalyst powder of (b) of Example 1, silicon carbide powder was used, thereby obtaining a honeycomb core piece coated with silicon carbide in an amount of 80 g in terms of dry weight per liter of the honeycomb.

(b) Supporting of Ir

The honeycomb core piece coated with silicon carbide obtained in (a) of Example 3 was immersed in 100 ml of a solution containing chloroiridic acid in an amount of 0.27 in terms of Ir in deionized water and was kept in it for 3 min at room temperature, so that the honeycomb core piece was impregnated with the Ir solution in the amount corresponding to the incipient wettness of the honeycomb. The excess Ir solution was removed by blowing air, and then after the honeycomb core piece was dried, it was kept in air at 750° C. for 1 hour, thereby obtaining an Ir-on-silicon carbide catalyst honeycomb (5).

EXAMPLE 4

Preparation of an Ir-on-Silicon Carbide Catalyst (Method C)

The Ir-on-catalyst honeycomb (5) obtained in Example 3 was held in a stream of hydrogen at 300° C. for 2 hours so that the Ir-on-catalyst honeycomb (5) might been subjected to reduction with the hydrogen, thereby obtaining an Ir-on-silicon carbide catalyst honeycomb (6).

EXAMPLE 5

Preparation of an Ir-on-Silicon Carbide Catalyst (a) and (b) of Example 1 were repeated, except that the amount of Ir to be supported on 100 g of silicon carbide whisker from the aqueous chloroiridic acid solution was changed from 0.5 g in (a) of Example 1 to 0.125 g, 0.75 g, and 1.5 g, thereby preparing Ir-on-silicon carbide catalyst honeycombs (7), (8), and (9) having catalyst coats in amounts of 0.1 g/liter, 0.6 g/liter, and 1.2 g/liter, respectively, in terms of dry weight.

COMPARATIVE EXAMPLE 1

Preparation of an IR-on-γ-Alumina Catalyst

A γ-alumina-coated honeycomb was obtained in the same way as in (a) of Example 3, except that, in place of the silicon carbide powder carrier, γ-alumina powder (tradename: KHA 24 having a BET specific surface area of 160 $m^2/g$ manufactured by Sumitomo Chemical Co., Ltd.), and then the obtained γ-alumina-coated honeycomb was impregnated with an Ir salt solution in the same way as in (b) of Example 3 and then was calcined in air at 500° C. for 4 hours, thereby obtaining an Ir-on-γ-alumina catalyst honeycomb (10).

The above procedure was repeated, except that, in place of the γ-alumina powder, as a carrier, anatase titania powder (having a BET specific surface area of 75 $m^2/g$ manufactured by Rhône-Poulenc) and silica alumina powder (having a BET specific surface area of 110 $m^2/g$ manufactured by Mizusawa Kagaku K. K. ) , thereby preparing an Ir-on-titania catalyst honeycomb (11) and an Ir-on-silica alumina catalyst honeycomb (12) respectively.

COMPARATIVE EXAMPLE 2

Preparation of an Ir-on-ZSM-5 Catalyst

H-type aluminosilicate zeolite ZSM-5 powder (having an $SiO_2/Al_2O_3$ ratio of 75 and a BET specific surface area of 430 $m^2/g$) was prepared in accordance with the method by L. D. Rollman and E. W. Valyocsik (Inorg. Synthesis, 22 (1982), 67 to 68). 100 g of this ZSM-5 powder was added to 2,000 ml of a solution containing 0.036M of an Ir complex, $[IrCl(NH_3)_5]Cl_2$, in deionized water to form a slurry, the slurry was stirred for 16 hours at room temperature and then was filtered, was washed with deionized water, was dried, and was calcined in air at 500° C. for 30 min to obtain a ZSM-5 powder supporting 0.6% Ir ( ion exchange rate: 22% in terms of $Ir^{3+}$) , and this ZSM-5 powder supporting 0.6% Ir was coated on a honeycomb to prepare an Ir-supported catalyst honeycomb (13).

COMPARATIVE EXAMPLE 3

Preparation of a Copper Ion Exchange ZSM-5 Catalyst 100 g of the ZSM-5 powder used in Comparative Example 2 was added to 2,000 ml of a solution containing 0.03M of copper acetate in deionized water to make a slurry, the slurry was stirred at room temperature for 16 hours, then filtered, washed, dried, and then calcined in air at 500° C. for 30 min to obtain a ZSM-5 powder supporting 1.2% of Cu (ion exchange ratio: 95% in terms of $Cu^{2+}$), and this ZSM-5 powder was coated on a honeycomb to obtain a Cu-on-ZSM-5 catalyst honeycomb (14).

COMPARATIVE EXAMPLE 4

Preparation of a Platinum-on-Silicon Carbide Catalyst, a Palladium-on-Silicon Carbide Catalyst, and a Rh-on-Silicon Carbide Catalyst Honeycombs coated with silicon carbide in an amount of 80 g/liter were obtained in a similar manner to that in (a) of Example 3, and the honeycombs were impregnated with Pt, Pd, and Rh respectively in a similar manner to that in (b) of Example 3, but using 100 ml of an aqueous solution containing chloroplatinic acid in an amount of 0.27 g in terms of Pt in place of 0.27 g of Ir of (b) of Example 3, 100 ml of an aqueous hydrochloric acid solution containing palladium chloride in an amount of 0.27 g in terms of Pd in place of 0.27 g of Ir of (b) of Example 3, and 100 ml of an aqueous solution of rhodium chloride in an amount of 0.27 g in terms of Rh in place of 0.27 g of Ir of (b) of Example 3, and then the honeycombs were calcined in air at 500° C. for 4 hours to prepare a Pt-on-silicon carbide catalyst (15), a Pd-on-silicon carbide catalyst (16), and a Rh-on-silicon carbide catalyst (17), respectively.

COMPARATIVE EXAMPLE 5

Preparation of a Pt-Rh-on-Alumina Catalyst (TWC)

120 g of active alumina having a BET specific surface area of 150 $m^2/g$ and an average particle diameter of 30 μm was placed in a mixer and 30 ml of an aqueous amine solution of platinum hydroxide containing 2.0 g of platinum was added dropwise little by little with stirring, so that the platinum hydroxide was dispersed and supported on the active alumina. Then after 15 ml of an aqueous solution of rhodium nitrate containing 0.41 g of rhodium was added thereto dropwise little by little to be dispersed and supported, 10 ml of 25% acetic acid was added dropwise little by little, thereby preparing 1.7% Pt-0.34% Rh-on-alumina powder (Pt/Rh weight ratio=5/1). This was treated similarly to (b) of Example 1 to obtain a Pt-Rh/$Al_2O_3$ catalyst honeycomb (18).

PERFORMANCE EVALUATION EXAMPLE 1

Evaluation of the Purification Performance and the Durability by Using a Lean Burn Engine Exhaust Model Gas With respect to the catalyst (1) of the Example 1 of the present invention and the catalyst of (14) of the Comparative Example 3, each having 400 cells and having a diameter of 2.54 cm and a length of 6.35 cm, the $NO_x$ elimination performance was investigated by supplying as a lean burn engine exhaust model gas a mixed gas made up of 500 ppm of NO (hereinafter the gas component concentration is shown by volume concentration unless otherwise stated), 1,500 ppm of propylene ($C_3H_6$), 1,000 ppm of CO, 10% of $H_2O$, 10% of $CO_2$, 5% of $O_2$, and the balance of $N_2$ (corresponding to A/F=19) onto the honeycomb piece of each of the catalysts at a SV of 40,000/hr and elevating the gas temperature at the inlet for the catalyst layer from 200°

C. to 500° C. at a rate of temperature increase of 30° C./min (mode A). The elimination rate of NO at 450° C. was 65% in the case of the catalyst (1) and 76% in the case of the catalyst (14).

Then, after the catalysts were subjected to an aging treatment at 800° C. for 5 hours under a stream of a gas mixture made up of 10% of $H_2O$ and 90% of air, the performance was evaluated using the above mode A. The NO elimination rate at 450° C. was 74% in the case of the catalyst (1) and 12% in the case of the catalyst (14).

The dependencies of the NO elimination rates of the catalysts (1) and (14) on aging are shown in FIG. 1. According to the results, it can be noticed that although the Cu ion exchange ZSM-5 catalyst (14) of the Comparative Example exhibits a high activity in the initial stage, the activity is quickly lost by the aging under heating at 800° C. in the presence of steam, whereas the catalyst of a working example of the present invention does not lose the activity and the NO elimination rate is improved on the contrary.

Table 1 shows NO elimination rates with respect to the catalysts (1) to (9) of the Examples of the present invention and the catalysts (10) to (18) of the Comparative Examples at a catalyst layer inlet temperature of 450° C. by the mode A after aging at 800° C. for 5 hours under a stream of air containing 10% of steam. According to Table 1, the following results have been found.

The catalysts (2) to (9) of the Examples besides the catalyst (1) also showed high NO elimination performances after aging.

The Ir catalysts (10) to (12) supported on porous metal oxides having high specific surface areas of the Comparative Example 1 which is a prior art example and the Ir-on-zeolite catalyst (13) of the Comparative Example 2 showed unsatisfactory performance of NO elimination rates, only about 18 to 38%, after aging at 800° C.

The catalysts (15) to (17) of the Comparative Example 4 wherein the carrier is the same as that of the catalyst of the present invention but the supported element is a noble metal other than Ir, that is, Pt, Pd, or Rh are very low in NO elimination rate.

The prior Pt-Rh/$Al_2O_3$ three-way catalyst shows little NO elimination activity under lean burn conditions wherein the air/fuel ratio is high like the mode A.

TABLE 1

NO elimination performance of catalysts after aging of 800° C.

| | Type of catalyst (Catalyst No.) | NO elimination rate (%) after aging at 800° C. |
|---|---|---|
| Example 1 | Ir/SiC (1) | 74 |
| Example 2 | Ir/SiC (2) | 72 |
| | Ir/TiC (3) | 63 |
| | Ir/TiN (4) | 59 |
| Example 3 | Ir/SiC (5) | 70 |
| Example 4 | Ir/SiC (6) | 68 |
| Example 5 | Ir/SiC (7) | 57 |
| | Ir/SiC (8) | 75 |
| | Ir/SiC (9) | 66 |
| Comparative Example 1 | Ir/$\gamma$-$Al_2O_3$ (10) | 38 |
| | Ir/$TiO_2$ (11) | 31 |
| | Ir/$SiO_2$.$Al_2O_3$ (12) | 26 |
| Comparative Example 2 | Ir/ZSM-5 (13) | 18 |
| Comparative Example 3 | Cu/ZSM-5 (14) | 12 |
| Comparative Example 4 | Pt/SiC (15) | 6 |
| | Pd/SiC (16) | 4 |
| | Rh/SiC (17) | 3 |

TABLE 1-continued

| Comparative Example 5 | Pt—Rh/$Al_2O_3$ (18) | 8 |
|---|---|---|

Note 1) Conditions of evaluation of the lean burn engine exhaust model gas:
Gas composition:  NO  500 ppm
  $C_3H_6$  1,500 ppm
  CO  1,000 ppm
  $H_2O$  10%
  $CO_2$  10%
  $O_2$  5%
  $N_2$  balance
SV:  40,000/hr Note 2) Aging conditions: under a stream of air containing 10% of $H_2O$ and the balance of air at 800° C. for 5 hours

PERFORMANCE EVALUATION EXAMPLE 2

The Kinetic Partitioning Between the Reaction of NO and HC and the Reaction of $O_2$ and HC With reference to the catalyst (1) of Example 1 of the present invention, the catalyst (10) of Comparative Example 1, and the catalyst (14) of Comparative Example 3, the kinetic partitioning between the reaction of HC and NO and the reaction of HC and $O_2$ after aging for 5 hours in air containing 10% of steam was evaluated. An exhaust model gas having a composition consisting of 500 ppm of NO, 3% of $O_2$, 0 to 3,000 ppm of propylene, and the balance of $N_2$(corresponding to an A/F of 17) was supplied to the honeycomb catalyst layer having a diameter of 2.54 cm and a length of 6.35 cm of each of the catalysts. The concentration of the propylene in the supplied gas was increased stepwise from 0 to 3,000 ppm, and the conversions of NO and $O_2$ at the steady state in each step were measured. The results are shown in FIG. 2. In FIG: 2, the conversion rate of $O_2$ is shown on the abscissa axis and the elimination rate of NO is shown on the ordinate axis.

According to the results shown in FIG. 2, the curve obtained by plotting the performance of the catalyst of the present invention lies far above the diagonal line and it can be understood that the selectivity of the reaction of HC and NO is remarkably high in comparison of that of the catalyst of Comparative Example 1 whose curve of the performance lies below the diagonal line and that of the catalyst of Comparative Example 3 whose curve is almost parallel to the abscissa axis.

We claim:

1. A catalyst for purifying exhaust gas, consisting essentially of an iridium with crystallite diameter of 2 to 100 nm supported on one carrier selected from the group consisting of metal carbides and metal nitrides, wherein the supported amount of said iridium is 0.005 to 10.0% by weight based on the total amount of the iridium and the carrier.

2. The catalyst as claimed in claim 1, wherein said carrier comprises at least one member selected from the group consisting of silicon carbide, titanium carbide, boron carbide, vanadium carbide, tantalum carbide, titanium nitride, chromium nitride, and zirconium nitride.

3. The catalyst as claimed in claim 2, wherein said carrier comprises at least one member selected from the group consisting of silicon carbide, titanium carbide, and titanium nitride.

4. The catalyst as claimed in claim 1, wherein said carrier is in the form of whisker or powder having a particle diameter of about 0.1 to about 100 $\mu$m.

5. The catalyst as claimed in claim 1, wherein said carrier has a BET specific surface area of 20 m²/g or less and a pore volume of 0.5 cm³/g or less.

6. The catalyst as claimed in claim 1, wherein said iridium is in the state of the metal or an oxide selected from the group consisting of IrO, $Ir_2O_3$, and $IrO_2$.

7. The catalyst as claimed in claim 1, wherein said iridium has a crystallite diameter of 5 to 20 nm.

8. A catalyst as claimed in claim 1, wherein said catalyst is in the form of a shaped product or is coated on a refractory support substrate.

* * * * *